United States Patent

Durrant et al.

[15] 3,649,321
[45] Mar. 14, 1972

[54] TREATMENT OF PIGMENTS

[72] Inventors: George G. Durrant, Healing; Peter L. Cowe, Cleethorpes, both of England

[73] Assignee: La Porte Industries Limited, London, England

[22] Filed: Jan. 9, 1970

[21] Appl. No.: 1,895

[30]     Foreign Application Priority Data

Jan. 14, 1969   Great Britain ....................... 2,154/69

[52] U.S. Cl. ....................... 106/300, 106/308 Q, 106/308 F
[51] Int. Cl. .......................................................... C09c 1/36
[58] Field of Search ........................... 106/300, 308 Q, 308 F

[56]         References Cited

UNITED STATES PATENTS

| 2,291,082 | 7/1942 | Jarmus et al. | 106/300 |
| 3,132,961 | 5/1964 | Pierpoint et al. | 106/308 Q |
| 3,436,239 | 4/1969 | Feld | 106/308 Q |

*Primary Examiner*—James E. Poer
*Attorney*—William G. Addison

[57]            ABSTRACT

Titanium dioxide particles having improved resistance to "dusting" prepared by providing a coating on the particles of a mixture of at least one ester and at least one silicone.

9 Claims, No Drawings

3,649,321

TREATMENT OF PIGMENTS

BACKGROUND OF THE INVENTION

Heretofore, it has been proposed to coat titanium dioxide pigments with chemical substances, for example, silicones, to improve the dispersibility of the pigment in organic media, for example, plastics materials. Pigments coated with the hitherto proposed materials, however, display bad "dusting" properties. Thus, they show a marked air dispersibility during, for example, the manufacture of the coated pigment or the processing of the pigment into plastics. Dusting is extremely disadvantageous because it results in loss of pigment and it can also give rise to the hazards associated with dusty atmospheres.

SUMMARY OF THE INVENTION

The present invention is based on the discovery that by the incorporation of an ester into a coating of a silicone material on a titanium dioxide pigment the dusting properties of the pigment are considerably reduced without impairing the dispersibility of the coated pigment in plastics materials.

The present invention accordingly provides a process which comprises treating the particles of a titanium dioxide pigment with at least one silicone and at least one ester to form a coating on the surface of the particles, the ester being an aliphatic ester or diester containing six or more carbon atoms, an aromatic ester or diester, or a trialkyl or triaryl phosphate.

The treated titanium dioxide pigments of the present invention may be incorporated in plastics materials, for example, polystyrene and polypropylene, and in paints and lacquers, for example alkyds and acrylics.

The ester should be used in the liquid state. Normally solid esters may be employed in solution in a suitable solvent, for example, acetone or ethyl alcohol. The ester should have a sufficiently low vapor pressure that it is not substantially removed from the pigment by drying at about 120° C. and, as plastics compositions incorporating the treated pigments may be used in injection moulding processes which operate at temperatures of about 200° C., the ester should preferably have a sufficiently low vapor pressure and also be stable at these temperatures.

Suitable esters include, for example, butyl stearate, dimethyl phthalate, dibutyl phthalate, dioctyl phthalate, dibenzyl phthalate, diphenyl phthalate, tributyl phosphate, tricresyl phosphate and esters derived from adipic acid, dioctyl phthalate being preferred. A mixture of esters may be employed in the present invention, for example, a mixture of any two or more of the above mentioned esters.

One of the main applications of the present invention is in the field of pigmented plastics. It will be appreciated that in this and similar applications the ester should be substantially insoluble in water and should not be highly colored.

The silicones used in the present invention are in general commercially available polysiloxanes, for example, alkyl or aryl substituted polysiloxanes, more especially methyl hydrogen polysiloxane, phenyl hydrogen polysiloxane, dimethyl polysiloxane and diphenyl polysiloxane. Cyclic polysiloxanes can also be used. Dimethyl polysiloxane is preferred. A mixture of silicones may be used in the present invention, for example, a mixture of any two or more of the above-mentioned silicones.

The titanium dioxide pigment may be, for example, anatase or rutile prepared either by the sulphate or the chloride process. The pigment particles are preferably classified in order to remove any coarse particles before treatment in the process of the present invention. If desired, the particles may be further subjected to a surface treatment, for example, to remove any impurities before being treated in the process of the present invention. The ester and the silicone may be applied to the particles simultaneously or separately, the order of treatment being unimportant. They may be applied as water emulsions or solutions in organic solvents. If they are to be applied simultaneously they may be used in the form of a solution in a mutual solvent. In some cases it may be possible to apply the ester and/or silicone by vapor phase addition.

The total weight of silicone plus ester used in the process of the present invention is preferably in the range of from about 0.1 percent to about 5 percent based on the weight of the untreated pigment particles. The ratio by weight of ester to silicone may vary within the range of from about 1:10 to about 10:1. Preferably, the silicone and the ester are used in approximately equal amounts, by weight.

It will often be desirable to coat the titanium dioxide pigment particles with, for example, one or more hydrous inorganic oxides, for example, hydrated silica or alumina. In this case the treatment by the process of the present invention will be carried out after the particles have been coated with, for example, the hydrous inorganic oxide.

In a preferred form of the process of the present invention the pigment particles are coated with one or more hydrous inorganic oxides, classified and washed to remove any soluble substances and are then treated with the silicone and the ester, the particles being subsequently dried and milled. Alternatively the pigment particles coated with the hydrous inorganic oxides may be dried and/or calcined partially to dehydrate the hydrous oxides and, if desired, milled before treatment with the silicone and the ester, either in solution or in the vapor phase.

To further illustrate the invention even more fully, the following specific examples are set forth; all parts and percentages given are by weight, unless otherwise indicated.

EXAMPLE 1

300 gm. of a washed slurry of titanium dioxide pigment coated with alumina were agitated vigorously while 1.8 ml. of dimethyl polysiloxane were added. The slurry was then filtered, dried and micropulverized to give pigment A.

A similar pigment B was prepared by the above method except that 1.8 ml. of dioctyl phthalate was added after the addition of the dimethyl polysiloxane. (The weights of ester and silicone each correspond to about 0.6 percent based on the weight of the pigment).

Each pigment was then mixed in a tumbler with polystyrene granules (2 parts pigment to 200 parts polystyrene by weight) and a disc-shaped sheet was formed from the resulting blend by injection moulding.

Both pigments A and B showed satisfactory dispersion in polystyrene but pigment B, prepared according to the invention, showed significantly less dusting when handling and mixing with plastics ingredients.

EXAMPLE 2

A pigment was prepared by the method of Example 1 using 1.8 ml. of dimethyl polysiloxane followed by 1.8 ml. of butyl stearate. The pigment showed good dispersibility in polystyrene and only very slight dusting.

EXAMPLE 3

Using the method of Example 1, a pigment was treated with 1.8 ml. of phenyl hydrogen polysiloxane. The resulting pigment showed good dispersibility in polystyrene but poor dusting properties, i.e., considerable dusting occurred.

EXAMPLE 4

Using the method of Example 1, a pigment was treated with 1.8 ml. of phenyl hydrogen polysiloxane followed by 1.8 ml. of dioctyl phthalate. The treated pigment was satisfactorily dispersible in polystyrene and had good dusting properties, i.e., very little dusting occurred.

What is claimed is:

1. A process for improving the dusting properties of titanium dioxide pigment particles which comprises contacting the particles with at least one silicone and at least one ester to form a coating on the surface of the particles, the silicone being selected from the group consisting of alkyl and aryl substituted polysiloxanes which may be cyclic, the ester being selected from the group consisting of aliphatic esters and diesters containing at least six carbon atoms, aromatic esters and diesters, and trialkyl and triaryl phosphates, the total weight of silicone plus ester being within the range of from about 1.1 percent to about 5 percent, based on the weight of the pigment particles, and the ratio, by weight, of silicone to ester being within the range of from about 1:10 to about 10:1.

2. A process as set forth in claim 1 wherein the silicone and ester are used in approximately equal amounts by weight.

3. A process as set forth in claim 1 wherein the pigment particles have previously been coated with at least one hydrous inorganic oxide.

4. A process as set forth in claim 3 wherein the hydrous inorganic oxide is selected from the group consisting of hydrated silica and hydrated alumina.

5. A process as set forth in claim 1 wherein the silicone and ester are applied simultaneously to the particles.

6. A process as set forth in claim 1 wherein the silicone and ester are applied in the form of an aqueous emulsion.

7. A process as set forth in claim 1 wherein the silicone and ester are applied as a solution in an organic solvent.

8. A process as set forth in claim 1 wherein the silicone and the ester are applied in the vapor phase.

9. A titanium dioxide pigment the particles of which are coated with a composition comprising at least one silicone and at least one ester, the silicone being selected from the group consisting of alkyl and aryl substituted polysiloxanes which may be cyclic, the ester being selected from the group consisting of aliphatic esters and diesters containing at least six carbon atoms, aromatic esters and diesters, and trialkyl and triaryl phosphates, the total weight of silicone plus ester being within the range of from about 0.1 percent to about 5 percent, based on the weight of the pigment particles, and the ratio, by weight, of silicone to ester being within the range of from about 1:10 to about 10:1.

* * * * *